United States Patent [19]
Crespel et al.

[11] Patent Number: 5,526,833
[45] Date of Patent: Jun. 18, 1996

[54] DEGREASING DEVICE PARTICULARLY FOR OPTICAL FIBERS

[75] Inventors: Daniel Crespel; Jean-Marc Cailleaux, both of Lannion; Jacques Caudrelier, Villorceau, all of France

[73] Assignee: France Telecom, Paris, France

[21] Appl. No.: 385,953

[22] Filed: Feb. 9, 1995

[30] Foreign Application Priority Data

Feb. 11, 1994 [FR] France .................................. 94 01673

[51] Int. Cl.⁶ ...................................................... B08B 3/10
[52] U.S. Cl. ..................................... 134/102.1; 134/102.2; 134/184
[58] Field of Search ........................... 134/102.1, 102.2, 134/182, 183, 184; 68/207, 183

[56] References Cited

U.S. PATENT DOCUMENTS

| | | | |
|---|---|---|---|
| 2,559,472 | 7/1951 | Shanaman | 134/102.2 |
| 2,720,210 | 10/1955 | Lueck | 134/102.2 |
| 3,259,049 | 7/1966 | Uithoven | 134/102.2 |
| 4,080,975 | 3/1978 | Williams, Jr. | 134/102.2 |
| 4,852,596 | 8/1989 | Fry et al. | 134/182 |
| 4,967,777 | 11/1990 | Takayama et al. | 134/102.2 |
| 5,014,727 | 5/1991 | Aigo | 134/184 |

FOREIGN PATENT DOCUMENTS

| | | | |
|---|---|---|---|
| 627888 | 8/1949 | United Kingdom | 134/102.2 |
| 961591 | 6/1964 | United Kingdom | 134/102.2 |

*Primary Examiner*—Frankie L. Stinson
*Attorney, Agent, or Firm*—Jacobson, Price, Holman & Stern

[57] ABSTRACT

A device for degreasing pieces such as optical fibers of a stripped cable comprises a tank containing a liquid solvent in which the pieces are immersed, a pressurized gas container having a gas outlet nozzle, a receptacle for holding the container vertical with the nozzle at the bottom, and a diffuser for gas passing from the nozzle into the liquid solvent below the pieces. The gas diffused into the solvent is cold and causes turbulence of the solvent. The grease is detached from the pieces and falls into a cavity.

11 Claims, 4 Drawing Sheets

DEGREASING DEVICE PARTICULARLY FOR OPTICAL FIBERS

BACKGROUND OF THE INVENTION

1—Field of the Invention

The invention concerns a degreasing device for degreasing pieces, particularly optical fibers of a stripped optical fiber cable.

2—Description of the Prior Art

The optical fibers of an optical fiber cable are covered with grease to protect them from moisture. For operations such as connecting the optical fibers all traces of grease must be removed from the optical fibers to be connected or spliced.

In a first prior art method a piece of cloth or paper impregnated with a solvent such as de-aromatized kerosene or alcohol is wiped over the fibers to be degreased. Although this removes grease in a satisfactory way, this method is feasible only for a small number of optical fibers to be degreased. For cables having several tens of optical fibers the optical fibers must be degreased one by one, after separating each fiber to be degreased from the other fibers, so that the degreasing operation is time-consuming and difficult, and accompanied by the risk of bending the fibers far enough to crack or break them.

A more complex second prior art method entails using an ultrasonic degreasing device or a degreasing device which foams a liquid solvent. These devices are more suitable for cables with several tens of fibers, and can degrease them in about ten minutes. However, both these devices require a source of electrical power and are relatively large and heavy. For this reason, they are both difficult to use on-site.

OBJECTS OF THE INVENTION

The main object of this invention is to provide a degreasing device which is autonomous, i.e., which does not require any source of electrical power and which is portable.

Another object of this invention is to provide a degreasing device which is at least as effective as the prior art degreasing devices, in particular enabling cables with several tens of optical fibers to be degreased in approximately 30 seconds.

SUMMARY OF THE INVENTION

Accordingly, a degreasing device comprises a tank adapted to contain a liquid solvent in which pieces to be degreased are immersed:

a container of pressurized gas having a gas outlet nozzle directed towards the bottom of the tank, and diffusing means lodged substantially at the bottom of the tank for diffusing the pressurized gas being released from the container nozzle into the liquid solvent under the pieces to be degreased.

The device according to the invention does not require any source of electrical power and is easy transportable and usable on-site.

In order to facilitate the gas ejection of the container, the degreasing device comprises means preferably disposed above the diffusing means for holding the pressurized gas container substantially vertical with the gas outlet nozzle directed towards the tanks the tank bottom. The holding means comprises a passage communicating with the diffusing means and having an opening which is shorter than the gas outlet nozzle whereby the gas outlet nozzle abuts against an internal shoulder located within the holding means and between the opening and the passage. To release the pressurized gas all that is required is to press on the bottom of the container to push the nozzle against the shoulder.

Preferably, the diffusing means comprises channels having one end in common and communicating with a passage receiving pressurized gas released from the gas outlet nozzle and respective ends communicating with holes discharging under the pieces to diffuse the pressurized gas into the liquid solvent. The gaz released is therefore distributed in the solvent.

The device further comprises a cavity located between the diffusing means and the bottom of the tank to collect grease removed from the pieces. The diffusing means comprises means for supporting the pieces to be degreased and through-holes discharging into the liquid solvent under the pieces to be degreased and into the cavity for collecting the grease. The grease which settles out into the cavity is therefore completely separated from the degreased pieces and cannot pollute the latter by contact with them.

The supporting means comprise a recess filled with the liquid solvent for containing the pieces to be degreased and the through-holes discharge into the bottom of the recess, or in variant the supporting means is substantially flat and the through-holes discharge via countersinks on the supporting means. The recess or the countersinks in the supporting means promote the flow of the grease towards the through-holes through which it collects in the cavity. The grease does not remain in the immediate proximity of the pieces to be degreased.

The degreasing device can comprise a grille facing the through-holes for avoiding a piece to fall in the cavity.

The device is intended particularly for degreasing optical fibers of an optical fiber cable. In this case the solvent is de-aromatized kerosene, for example.

BRIEF DESCRIPTION OF THE DRAWINGS

The foregoing and other pieces, features and advantages of the invention will be apparent from the following detailed description of several embodiments of the invention with reference to the corresponding accompanying drawings in which.

DESCRIPTION OF THE PREFERRED EMBODIMENTS

Figure 1:
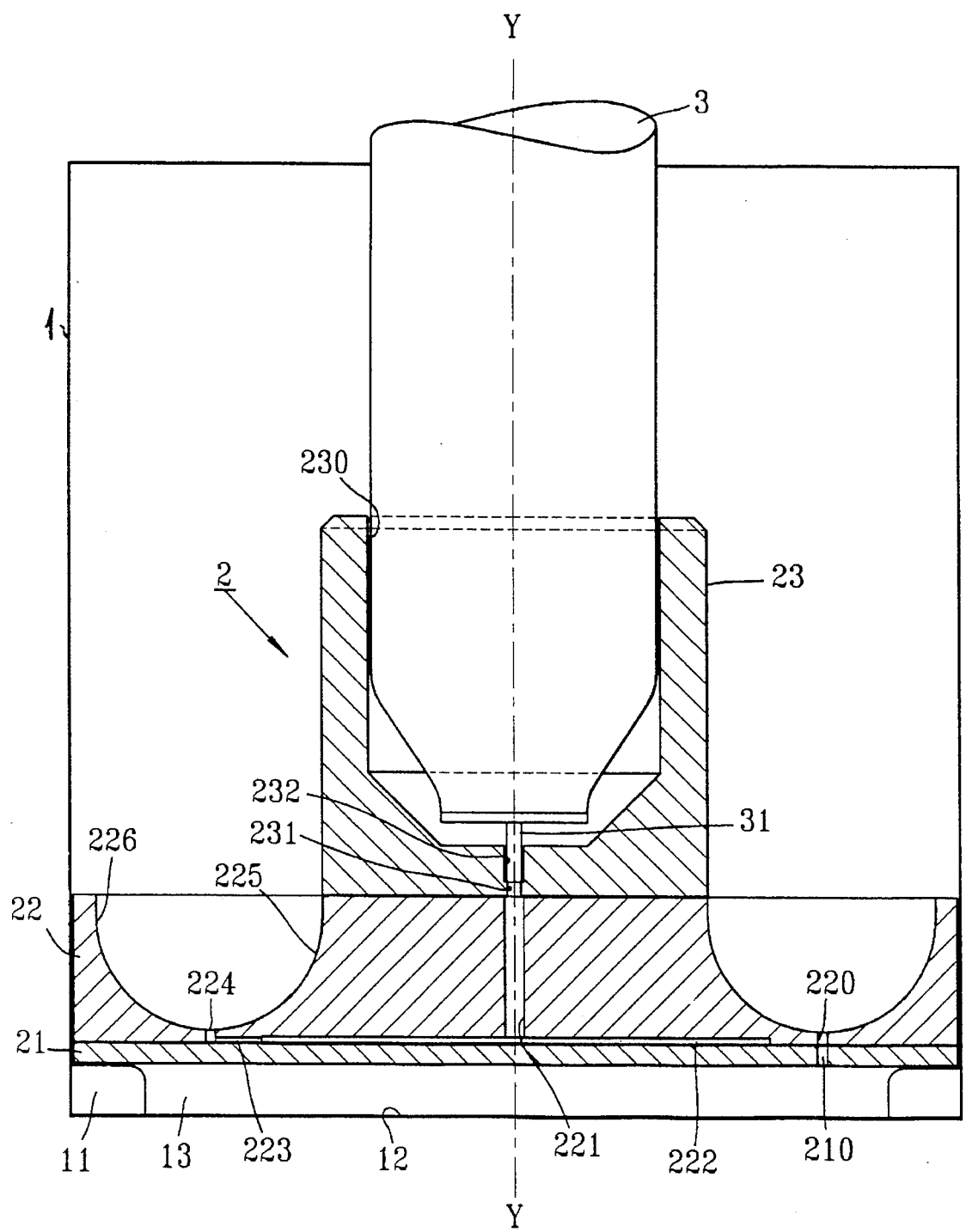
FIG. 1 is a vertical view of a degreasing device of the invention in section on the angled line I—I in FIG. 2.
Figure 2:
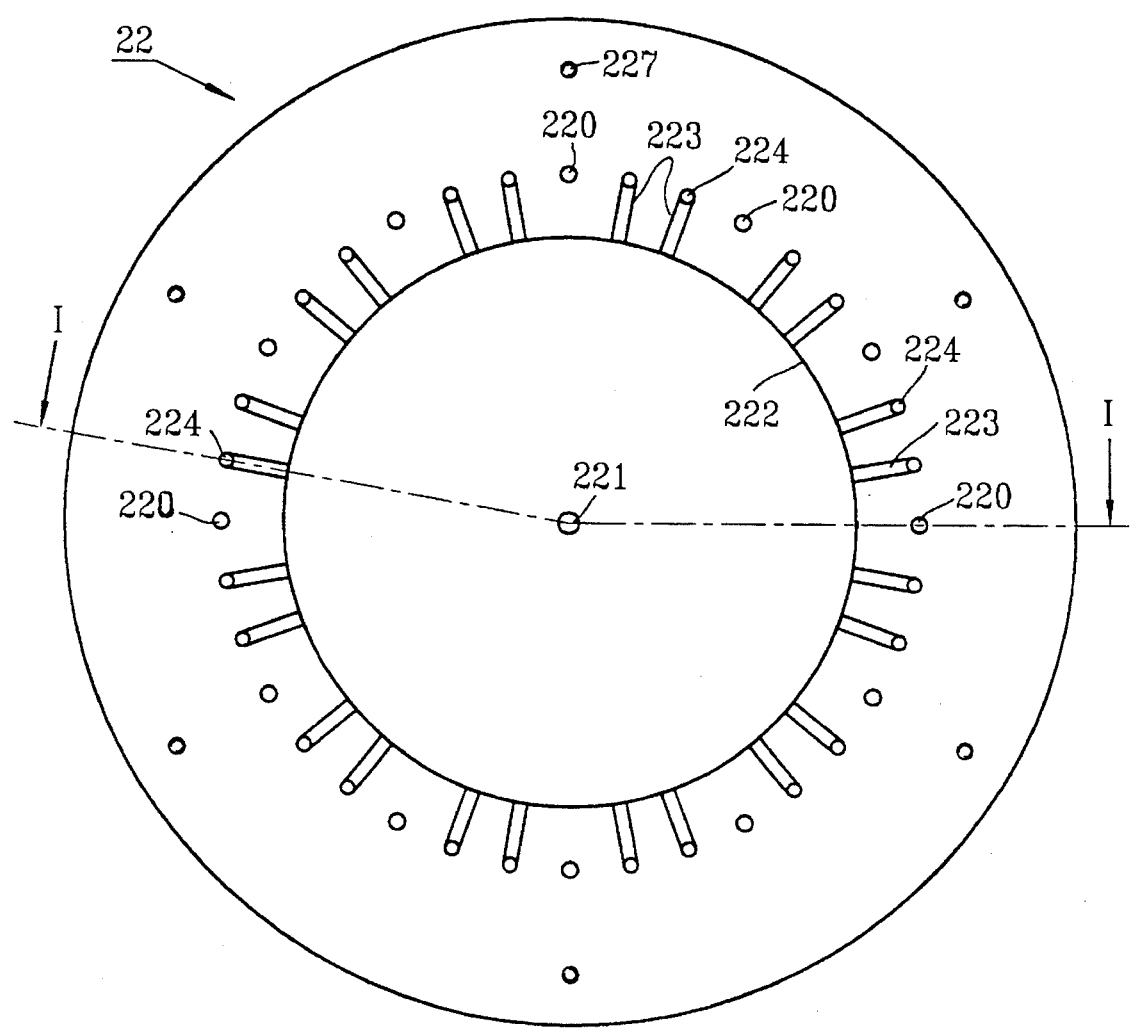
FIG. 2 is a bottom view of a first embodiment of gas diffuser included in the degreasing device of the invention.

Referring to FIGS. 1 and 2, a device for degreasing pieces, particularly the end of an optical fiber cable, comprises a tank 1 with an interior fitting 2 and a container of pressurized gas in the form of a compressed gas aerosol 3. This device is easily transportable as it typically weighs only about two kilograms.

The general shape of the tank 1 and its dimensions are suited to the pieces to be degreased. To give a concrete example, the tank 1 is cylindrical with a diameter in the order of about 20 cm and a height in the order of about 10 cm to 30 cm. The entire device features axial symmetry about the vertical axis YY of the tank 1. The tank 1 is made from plastics material or metal.

The tank 1 has handles on the outside (not shown) and an airtight removable lid (not shown) to facilitate transporting the device.

The fitting 2 comprises a first member 21 in the form of a disk whose diameter is substantially equal to the inside diameter of the tank 1 and which is in the order of 5 mm thick. The disk 21 is placed or preferably fixed by screws or locked by lugs on a circular shoulder 11 in the bottom of the tank 1, or is placed on feet (not shown) evenly distributed over the bottom 12 of the tank 1 and fixed to the bottom 12 of the tank 1 or to the bottom of the disk 21. A circular cavity 13 is thus formed between the bottom 12 of the tank 1 and the disk 21. This cavity is separated from the remainder of the interior volume of the tank 1. The disk 21 incorporates a plurality of through-holes 210 having a diameter in the order of five millimeters. The through-holes 210 are equi-angularly distributed around the axis YY in order that the cavity 12 communicates with the remainder of the volume of the tank 1. As an alternative, the member 21 is a grille or includes a circular or annular grille over part of its surface.

The fitting 2 comprises a second member 22 in the form of a disk whose diameter is substantially equal to the inside diameter of the tank 1 and thus equal to the diameter of the disk 21. As will emerge below, the disk 22 is a gas diffuser. The thickness of the disk 22 is in the order of two centimeters to four centimeters. The disk 22 comprises grease collecting through-holes 220 which have the same diameter as the holes 210 in the disk 21, with which they are respectively coaxial. The disk 22 further comprises a long vertical central passage 221 discharging onto the bottom surface of the disk 22 via a circular opening 222. Channels in the form of grooves 223 on the bottom surface of the disk 22 extend radially from the periphery of the opening 222. The grooves 223 open onto the top surface of the disk 22 through vertical gas diffusion holes 224 through the disk 22. In the embodiment shown in FIG. 2 each groove 223 opens via one hole 224 and the holes 224 lie on a circle, for example the same circle as the holes 220. In this case the holes 224 and the holes 220 alternate in a regular manner, with two holes 224 for each hole 220.

As an alternative, each groove 223 opens through more than one hole 224 or the holes 224 lie on a circle whose diameter is less than the circle on which the holes 220 lie, for example, or the holes 224 lie on more than one circle. As a further alternative, the grooves 223 and the opening 222 are replaced by passages in the disk 22 connecting the central passage 221 to the holes 224, and the gas diffusion holes 221 and 224 open only onto the top surface of the disk 22. This variant is particularly advantageous if the member 21 is a grille.

The top surface of the second disk 22 is a support for the optical fibers to be degreased and incorporates a semicircular radial section annular recess 225 which forms a circular rim 226 at the perimeter of the disk 22. The holes 220 and 224 open into the bottom of the recess 225.

The second disk 22 is placed in the tank 1 on top of the first disk 21 so that the holes 210 and 220 are aligned with each other. A mortice and tenon arrangement locates the disk 22 relative to the disk 21. The disks 21 and 22 are preferably glued or screwed together as indicated at 227 in FIG. 2.

Figure 3:
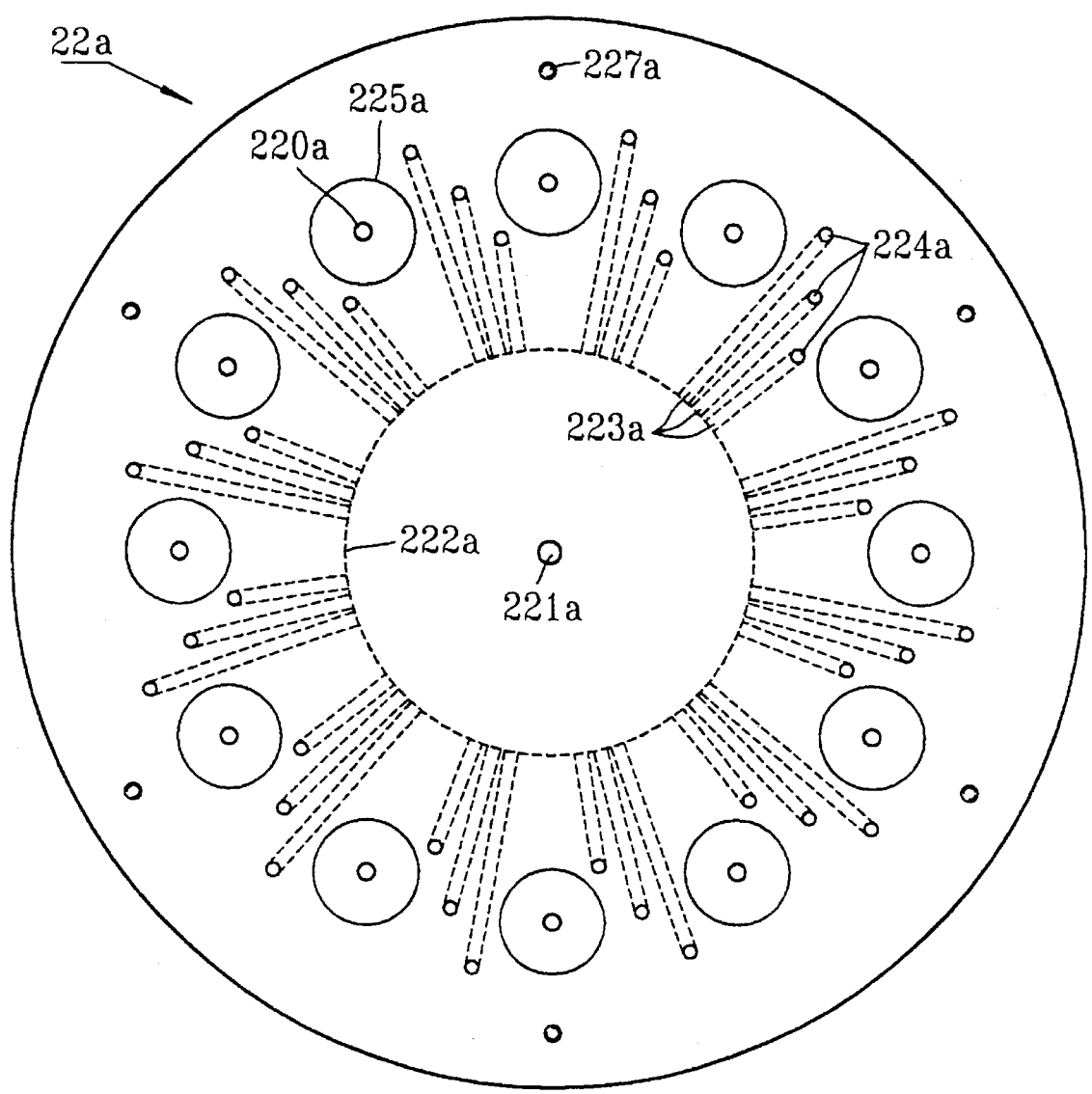
FIG. 3 is a top view of a second embodiment of gas diffuser.

Referring to FIG. 3, a second embodiment of the gas diffuser 22a differs from the first diffuser 22 in the following respects.

The diffuser 22a is a disk whose diameter is substantially equal to the inside diameter of the tank 1 and comprises a central through-passage 221a discharging onto the bottom surface of the disk 22a via a circular opening 222a from the periphery of which extend radial grooves 223a. The latter end at vertical gas diffusion through-holes 224a which lie on three concentric circles. The disk 22a comprises grease collecting through-holes 220a similar to the holes 220 previously described. The disk 22a has no annular recess on its upper surface, which is substantially plane. Each hole 220a opens via a countersink or a spot facing 225a on the top surface of the disk 22a. The disk 22a shown in FIG. 3 has twelve grease collecting holes 220a and thirty six gas diffusion holes 224a.

Referring again to FIG. 1, the fitting 2 comprises a third member 23 which is a receptacle adapted to receive the pressurized gas container 3. The latter is a commercially available compressed gas aerosol which is cylindrical in shape and has a spray nozzle 31. The gas in the aerosol 3 is preferably a dry neutral gas such as compressed air.

The shape of the receptacle 23 matches the shape of the top of the aerosol and the receptacle includes a cylindrical bore 230 whose diameter is substantially equal to the diameter of the compressed air aerosol 3. The bottom of the bore 230 is formed by a conical shoulder with a central passage 231 with an opening such as a cylindrical spot facing 232 with substantially the same diameter as the nozzle 31 of the aerosol 3 and a length less than that of the nozzle 31.

The receptacle 23 is coaxial with the disk 22 and the central passages 221 and 231 are therefore aligned. The inside diameter of the annular recess 225 in the disk 22 is substantially equal to the outside diameter of the receptacle 23 and more than twice the minimal radius of curvature that can be imposed on the optical fibers without risk of cracking or breaking them.

The receptacle 23 is glued or screwed to the disk 22. As an alternative, the receptacle 23 and the disk 22 are molded or machined in one piece. As a further alternative the receptacle 23 and the disk 22 are demountably joined together by a mortice and tenon arrangement.

In all cases the compressed air aerosol 3 is accommodated vertically in the receptacle 23 in order that the atomizer nozzle 31 is at the bottom, facing towards the bottom 12 of the tank, and bearing on the shoulder between the spot facing 232 and the hole 231.

As an alternative, depending on the shape of the pieces to be degreased, the receptacle 23 and the aerosol 3 are located on one side of the tank 1 rather than at the center of the tank 1.

Figure 4:
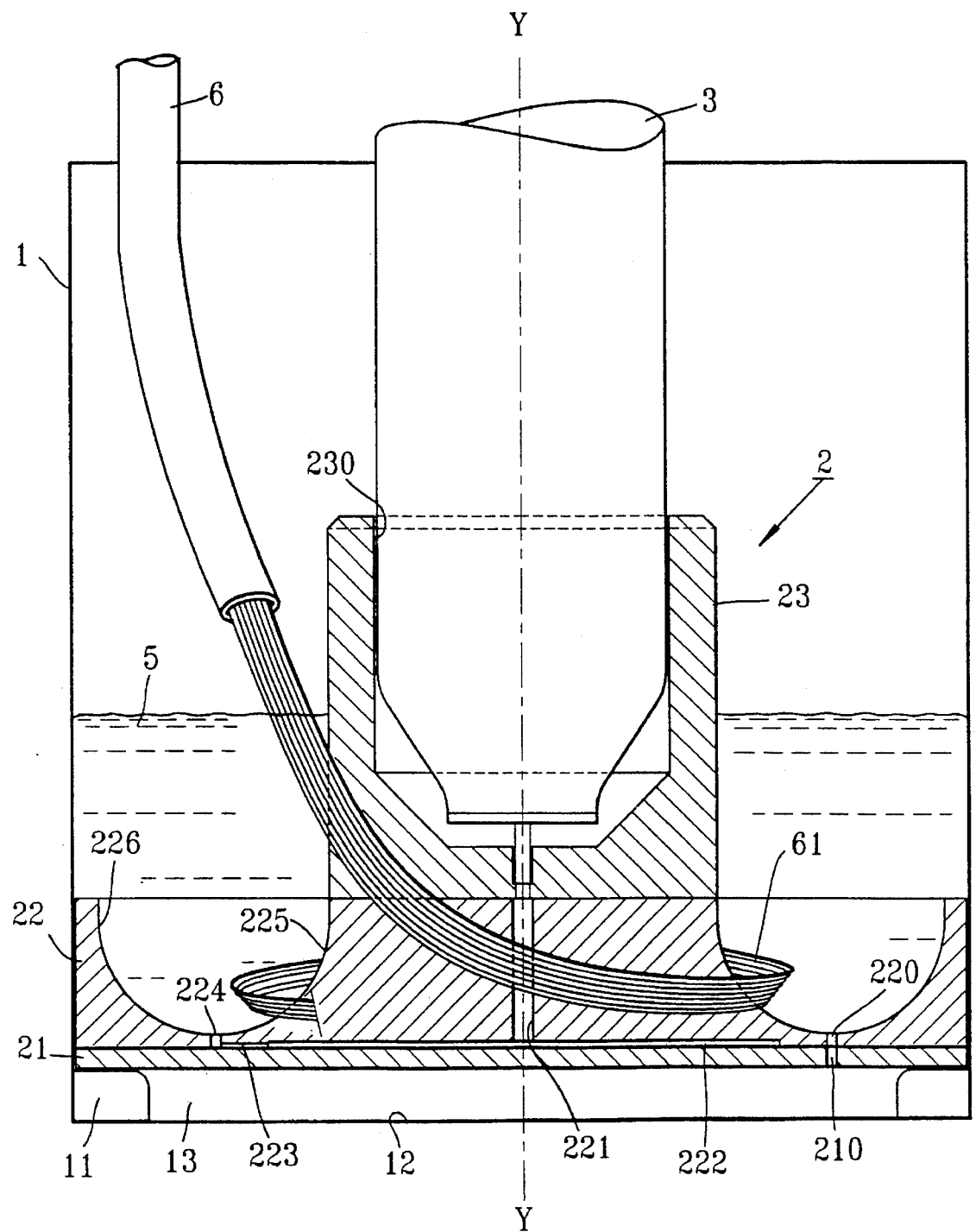
FIG. 4 is a view analogous to FIG. 1 showing the degreasing device containing optical fibers to be degreased.

The operation of the degreasing device is described with reference to FIG. 4. The device comprises the assembled members previously described and the tank 1 contains a liquid solvent 5 to a depth such that the top surface of the disk 22 or 22a is below the surface, with the result that the solvent fills the cavity 13 and part of the upper volume of the tank 1. The liquid solvent is de-aromatized gasolene or de-aromatized kerosene, for example, which is particularly suitable for degreasing optical fibers. Other solvents can be used, for example trichlorethylene, a solvent comprising an isotropic mixture of de-aromatized hydrocarbons, or an alcohol-based solvent.

An optical fiber cable 6 comprises a grooved elastic material extruded rod. The rod coats a central strength member such as a steel wire which reinforces the cable to prevent mechanical stresses on the optical fibers. The rod comprises helical grooves on the outside of the rod. Each helical groove contains at least one optical fiber 61. The cable comprises 36, 60 or 120 optical fibers, for example. A filler material covers the optical fibers to protect them from moisture and mechanical stresses. The filler material is a silicone or hydrocarbon grease.

As an alternative, the optical fiber cable comprises extruded plastics tubes twisted up around a central strength member. Each tube contains optical fibers covered with grease.

As a further alternative, the cable comprises a tubular protective jacket in which are disposed optical fibers covered with grease.

In all cases an operator first strips the optical fiber cable 6 at one end of the cable to a distance between a few tens of centimeters and two meters, to produce a "ponytail" of 36, 60 or 120 optical fibers, for example. The fibers covered with grease must be degreased before splicing or connecting them.

The optical fibers 61 from the stripped cable 6 are inserted into the device through the opening at the top of the tank 1 so that they are immersed in the liquid solvent 5 and coiled in the annular recess 225 and around the receptacle 23.

The aerosol 3 is depressed by hand so that the atomizer nozzle 31 is pressed onto the small shoulder between the spot facing 232 and the hole 231, and draws back into the aerosol 3 to open a valve which releases pressurized gas from the aerosol. Because the aerosol 3 is inverted as compared to its usual position of use, i.e. because the spray nozzle of the aerosol 3 is at the bottom, the gas dispensed from the aerosol is at a low temperature. The expanding gas flows in succession through the passages 231 and 221 and is then distributed via the circular recess 222 into the grooves 223 before diffusing via the holes 224 into the solvent 5 below the optical fibers 61. Because the holes 224 are evenly distributed on the disk 22 the gas is diffused into all of the volume of solvent in which the optical fibers are immersed.

The cold gas causes turbulence in the liquid solvent. The grease on the optical fibers congeals and loses its adhesive properties. The solvent decants owing to the turbulence in the cooled solvent which detaches the grease from the optical fibers. The grease then drops to the bottom of the recess 225 and passes into the cavity 13 through the holes 210 and 220. The annular recess 225 or the countersinks 225a promote flow of the grease towards the holes 210 and 220.

The "ponytail" of optical fibers is completely degreased in about 30 seconds, and this requires no input of electrical power.

The invention has been described with reference to degreasing optical fibers. In particular, the axial symmetry of the device is well suited to flexible filamentary pieces in order to reduce the overall size of the device. Nevertheless, the tank 1 and the members 21, 22, 23 can be long and rectangular, for example.

The invention applies to any type of piece on which grease or oil is deposited. For example, mechanical parts such as ball bearings, motor drive chains, screws and any other parts which are difficult to degrease because of their complicated surface are perfectly degreased using the degreasing device of the invention.

What we claim is:

1. A degreasing device comprising a tank adapted to contain a liquid solvent in which pieces to be degreased are immersed, a container of pressurized gas having a gas outlet nozzle directed towards the bottom of said tank, diffusing means lodged substantially at the bottom of said tank for diffusing said pressurized gas being released from said container nozzle into said liquid solvent under said pieces to be degreased, and means disposed above said diffusing means for holding said pressurized gas container substantially vertical with said gas outlet nozzle directed towards said bottom of said tank.

2. The device claimed in claim 1 wherein said holding means comprises a passage communicating with said diffusing means and having an opening which is shorter than said gas outlet nozzle whereby said gas outlet nozzle abuts against an internal shoulder located within said holding means between said opening and said passage.

3. The device claimed in claim 1 wherein said diffusing means comprises channels having one common end communicating with a passage receiving said pressurized gas released from said gas outlet nozzle and respective ends communicating with holes discharging under said pieces to diffuse said pressured gas .into said liquid solvent.

4. A device as claimed in claim 1 further comprising a cavity located between said diffusing means and said bottom of said tank to collect grease removed from said pieces.

5. The device claimed in claim 4 wherein said diffusing means comprises means for supporting said pieces to be degreased and through-holes discharging into said liquid solvent under said pieces to be degreased and into said cavity for collecting said grease.

6. The device claimed in claim 5 wherein said supporting means comprises a recess filled with said liquid solvent for containing said pieces to be degreased and said through-holes discharge into the bottom of said recess.

7. The device claimed in claim 5 wherein said supporting means is substantially flat and said through-holes discharge via countersinks on said supporting means.

8. The device claimed in claim 5 further comprising a grille facing said through-holes.

9. The device claimed in claim 2 wherein said diffusing means comprises means for supporting said pieces to be degreased.

10. The device claimed in claim 1 wherein said liquid solvent is selected from de-aromatized kerosene, de-aromatized gasolene, trichlorethylene, an isotropic mixture of hydrocarbons and an alcohol-based propassage.

11. The device claimed in claim 1 wherein said pieces to be degreased are optical fibers of an optical fiber cable.

* * * * *